United States Patent

Summerfield

[15] 3,675,930

[45] July 11, 1972

[54] STRIP RECORD FOR A PHONOGRAPH

[72] Inventor: William F. Summerfield, Huntington Beach, Calif.

[73] Assignee: Mattel, Inc., Hawthorne, Calif.

[22] Filed: Sept. 2, 1970

[21] Appl. No.: 68,876

[52] U.S. Cl. ....................274/11 R, 274/1 A

[51] Int. Cl. ....................G11b 3/00

[58] Field of Search....................274/1.1, 9 R, 39 R, 11

[56] References Cited

UNITED STATES PATENTS

| | | | |
|---|---|---|---|
| 3,580,585 | 5/1921 | Stastny et al. | 274/1 A |
| 1,076,741 | 10/1913 | Bliss | 274/39 R |
| 3,325,916 | 6/1967 | Greenlee | 274/1 R |

*Primary Examiner*—Harry N. Haroian
*Attorney*—Seymour A. Scholnick

[57] ABSTRACT

A toy phonograph with an elongated strip record having numerous slightly curved grooves extending across its width, and a head having several styluses arranged in a circle, the head rotating so that the styluses engage successive grooves to play them and to slowly advance the record along its length. An acoustical speaker cone contacts a side of the strip record opposite the styluses, so that vibrations of the tape directly drive the speaker cone.

6 Claims, 6 Drawing Figures

INVENTOR
WILLIAM F. SUMMERFIELD
BY Max E. Shirk
ATTORNEY

STRIP RECORD FOR A PHONOGRAPH

BACKGROUND OF THE INVENTION

1. Field of the Invention

This invention relates to toy phonographs.

2. Description of the Prior Art

The most common type of toy phonographs employ either a disc record with one or more spiral grooves or a long strip record with one or more grooves running along its length. These records do not efficiently utilize their surface area, inasmuch as a large portion of the record face does not contain grooves. One type of record which has been proposed employs a strip with numerous parallel grooves extending laterally or diagonally across its width. Such a record can be played by a head with several needles or styluses arranged in a circle, the record being slowly advanced to cause the styluses to rotate so that the styluses successively engage the grooves. However, it is difficult to advance the record in a manner to smoothly rotate the styluses. In addition, it is difficult to pick up sounds from the several rotating styluses, so they can be amplified either acoustically or electrically.

OBJECTS AND SUMMARY OF THE INVENTION

An object of the present invention is to provide a simple toy phonograph of at least moderate fidelity, which has a record that utilizes a large proportion of its surface.

Another object is to provide a toy phonograph which picks up sounds for amplification in a novel and efficient manner.

In accordance with one embodiment of the present invention, a simple, novel and highly entertaining toy phonograph is provided which can play a record that efficiently utilizes its surface area. The phonograph includes a long strip record having a multiplicity of closely spaced grooves extending across its width, each groove curved at a predetermined radius of curvature. The grooves are played by a rotatably mounted head with several styluses spaced about its axis of rotation, and with the axis of rotation spaced laterally from the center of curvature of the record groove being played. The head is rapidly rotated so that the styluses successively engage the record grooves. The displacement of the axis of rotation of the head from the center of curvature of the grooves results in each stylus advancing the record slightly, so that the next stylus to engage the record engages the next succeeding groove. Thus, the record automatically advances as the head is rotated.

The record grooves are modulated in depth. A speaker cone for acoustically amplifying sounds has a center portion biased against a face of the record strip opposite the location where styluses pass across the strip. The head with stylus points is massive as compared to the strip and speaker cone, so that the strip record vibrates rather than the styluses. The vibrations of the strip record are directly transmitted to the speaker cone which amplifies them.

The strip record is formed in a continuous band that is held in a housing. No rollers or the like are required at either end of the loop, but only guides for guiding it past the speaker and playing head. A window is formed in the housing for viewing a decorated face of the record strip. This decorated face of the record strip has scenes printed thereon. As the strip is played and it slowly advances, the scenes pass across the window. The scenes can be correlated with the sounds produced by the record, so that the sounds describe the scene or represent noises made by objects, animals or persons in the scene.

The novel features of the invention are set forth with particularity in the appended claims. The invention will be best understood from the following description when read in conjunction with the accompanying drawings.

DESCRIPTION OF THE PREFERRED EMBODIMENTS

Figures 1, 2, 3, 4, 5, 6:
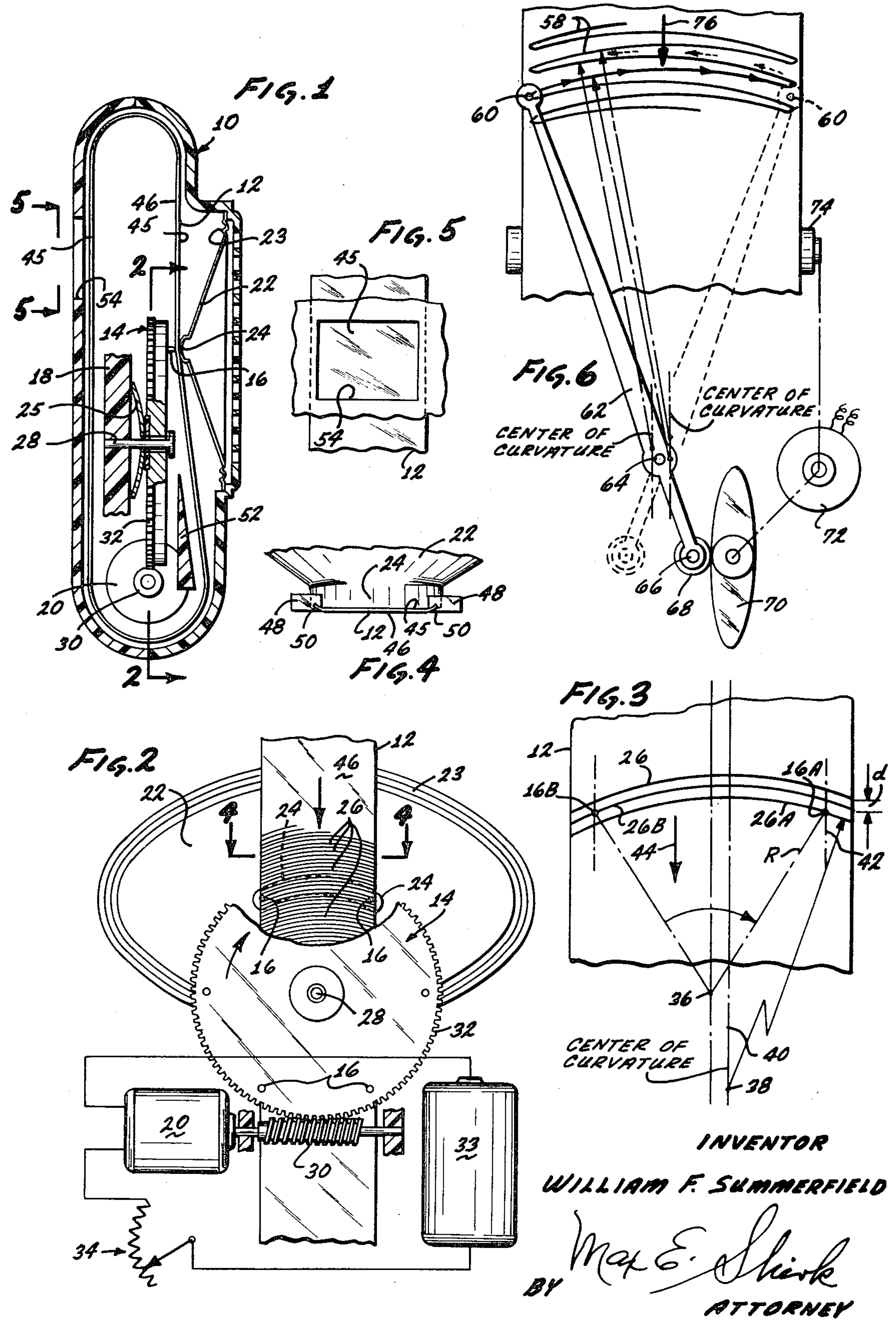
FIG. 1 is a sectional side view of a toy phonograph constructed in accordance with one embodiment of the present invention.
FIG. 2 is a sectional view taken on the line 2—2 of FIG. 1.
FIG. 3 is an enlarged, partially diagrammatic view, of one face of the record of FIG. 2 which contains grooves.
FIG. 4 is a partial sectional view taken on the line 4—4 of FIG. 2.
FIG. 5 is a view taken on the line 5—5 of FIG. 1.
FIG. 6 is a partial view of a toy phonograph constructed in accordance with another embodiment of the invention.

FIG. 1 illustrates a toy phonograph constructed in accordance with the invention, which includes a housing 10, a strip record 12 disposed within the housing and having grooves therein defining sounds, and a playing head 14 with several needles or styluses 16 that can engage the grooves in the record to cause reproduction of the sounds. The playing head 14 is rotatably mounted on a bracket 18 which is fixed to the housing 10, and the head is rotatably driven by a motor 20. A speaker diaphragm or cone 22 disposed within the housing has a central portion 24 biased against a face of the strip record 12 opposite the face engaged by the stylus 16. The cone is resiliently mounted at a resilient corrugated circumferential portion 23 thereof. A resilient washer 25 urges the playing head against the strip record.

As also shown in FIG. 2, the strip record 12 contains a multiplicity of grooves which extend substantially laterally across the width of the strip. The playing head 14 supports six styluses 16 which can engage the record grooves. It should be noted that the styluses can be formed integrally with the head instead of being separate members, as by coining points in a disc. As the playing head 14 rotates, the styluses engage the grooves in turn, each stylus engaging the next successive groove on the record. The styluses not only are used to produce vibrations to play the record, but they also advance the record slowly along its length.

The playing head 14 is rotatably mounted on a shaft 28 which is fixed to the bracket 18. The motor 20 that rotates the head, drives a worm gear 30 that drives a gear portion 32 at the periphery of the playing head. The motor 20 is energized by a battery 32 that is coupled through a variable resistor 34 to the motor to enable variation of the playing speed.

FIG. 3 illustrates the manner in which the grooves 26 of the record are formed, and indicates the path of the styluses 16 which enables a smooth advancement of the record by the styluses and in a manner that allows the styluses to play successive record grooves. The styluses 16 rotate about a fixed axis 36, and follow a path with a radius of curvature R. Each of the record grooves 26 is substantially an arc of a circle with the same radius of curvature R. The groove 26A has a center of curvature at the point 38 which is displaced from the center of curvature 36 of the stylus paths. In fact, as the record slowly advances, the center of curvature of the grooves moves along a line 40 which does not pass through the axis of rotation 36 of the styluses, but is displaced from it. It is this displacement which results in the styluses smoothly advancing the record.

An understanding of the manner of record advancement can be gained by considering its response to styluses which pass across it. When the stylus 16A has reached a position along a line 42 near the right edge of the record strip, the next stylus 16B is in a position to enter the next groove 26B. As the stylus 16B moves along its path to the right edge of the strip, it urges the record 12 to move in the direction of arrow 44, so that by the time the stylus 16B has reached the position of stylus 16A, the groove 26B will have reached the position of groove 26A. The record will have then advanced by the distance *d*. The curvature of the grooves results in the record strip being moved at a substantially constant speed as the styluses move successively across it. This substantially eliminates jerking movements. For example, if the record grooves extended in a straight line, a stylus moving in a circular path would move the record in one direction and then in the other direction each time it passed across a strip. While it is not necessary that the grooves extend in perfectly circular paths, it is desirable that they be substantially arcs of a circle of about the same radius as the path of the needles. Actually, a curve which is slightly different from a circle may theoretically provide a more constant record speed, but the difference often would not be noticeable, and such a curve would be very close to an arc of a circle.

The grooves 26 are modulated in depth, so that variations in depth of the groove define the sounds to be reproduced. The width of the strip is somewhat greater than the distance between adjacent styluses of the playing head, so that one stylus has not quite left the strip when the next stylus is just entering the strip. The trailing end of one groove, such as groove 26A, should define the same sound as the starting portion of the next succeeding groove 26B, and the sounds are preferably in phase to reduce discontinuities. The depth modulation of the grooves tends to vibrate both the styluses and the record strip. While it would be possible to couple speaker cones or other pick-ups to the styluses, some complication would result from the fact that several rotating styluses are involved. Instead, the styluses are rigidly supported, causing the record itself to vibrate, which vibrations are transmitted to the speaker cone.

The speaker cone 22 serves to acoustically amplify vibrations produced as the styluses move along the grooves. The center portion 24 of the speaker cone is disposed against a face 45 of the record opposite the face 46 in which the grooves are cut. The strip record 12 is constructed of thin flexible material, so that it has low mass and small resistance to vibration. The speaker cone 22 also has a relatively small mass. Accordingly, the speaker cone and a portion of the record which lies against it can be readily vibrated to produce a sound. In order to encourage such vibrations, the styluses 16 are rigidly fixed to the playing head 14 and the playing head 14 has a substantial mass to resist vibrations. Thus, unlike the usual phonograph wherein vibrations of the stylus are picked up and amplified, in this invention vibrations of the record are picked up and amplified.

In order to provide efficient amplification of record vibrations, the center portion 24 of the speaker cone is formed with a substantial width slightly greater than the width of the strip, and with a height which is just sufficient to cover the path of the needles over the grooves. The rest of the speaker cone is of a substantially oval form to efficiently couple vibrations of the center portion 24 to the atmosphere. It may be noted that a flat sounding board or other speaker means could be substituted for the speaker cone, although generally with some loss in fidelity.

At the location along the record where the styluses engage the grooves, it is desirable to provide guides 48, shown in FIG. 4, for bending down the edges of the strip record. The bending of the edges prevents the styluses from catching on the edge of the strip record and tearing it. Only a small portion of the edges are bent, so a stylus is always pressing against a groove. The guides 48 can be formed with slots 50 very close to the surface nearest the styluses, to minimize the amount of bending of the record strip. The record should also be guided to positions spaced below the path of the styluses where the styluses are not intended to engage the record. As shown in FIG. 1, a guide 52 fixed to the housing 10 serves to prevent contact of the record with the styluses except at a location opposite the center portion 24 of the speaker cone. The record strip 12 extends in a loop, but there is no need for rollers or the like at either end of the loop, inasmuch as the strip tends to maintain itself in a loop form.

As the styluses rotate to play the sounds defined by the record grooves, the record advances slowly along its loop path. This allows a further entertainment feature to be provided, by printing pictures on the face 45 of the strip record which lies opposite the face with the grooves. A window 54 formed in the housing allows a child to view the side 45 of the record. The scenes or pictures printed on the face 45 of the record can be synchronized with the sounds in the grooves, so that the sound being played at any given time closely corresponds to the picture portion displayed through the window. Thus, for example, the sounds may be a narration of a story with scenes displayed through the window, or the sounds may represent those made by objects, animals or persons displayed in the scenes. Separate discrete pictures may be shown, or a continuous picture or background may be shown with various objects or characters coming into position opposite the window at different times. Where separate pictures are shown, shutters or the like may be included to alternately block and open the window. Also, if it is desired to start a story at the beginning, the phonograph mechanism can be constructed so that the motor 20 runs continuously until the end of the story is reached, at which point a hole or protrusion on the record strip can operate a switch to turn off the motor. The scenes can be placed on either side of the record, or may even be transparencies of the edges of a wide record strip.

FIG. 6 illustrates a toy phonograph constructed in accordance with another embodiment of the invention. In this phonograph, a record strip 56 is provided which has a groove 58 that zig-zags across the width of the strip. The groove is played by a stylus or needle 60 at the end of a lever 62 that is pivotally mounted at 64. One end 66 of the lever opposite the needle has a roller 68 that engages a cam 70. The cam 70 is rotated by a motor 72. As the motor 72 rotates, the cam 70 drives the lever 62 to pivot it back and forth. A spring (not shown) constantly urges the roller 68 against the cam 70. The motor 72 also applies a constant torque to a roller 74 which urges the strip record 56 to move in the direction of the arrow 76. The rate of advance of the strip record 76 is limited by the engagement of the stylus in the groove. As the stylus approaches either limit of its excursion, the rate of advance of the strip record 76 is allowed to speed up as the stylus sweeps through the sharp reversing turn in the groove. As the stylus traverses the broad arcuate paths across the width of the strip record, the rate of advance of the strip record is very slow, and may even be zero.

As the stylus 60 moves in an arc from one side of the record strip to the other, it follows a sinuous path along the record groove 58. In order to assure smooth travel of the needle along the path, the groove 58 is formed substantially in a series of arcs of a radius equal to or only slightly different from the radius on the path of the needle 60. The cam 70 that moves the lever from side to side is shaped to pivot the needle at the proper speed so as to smoothly follow along the groove. Vibrations of the needle 60 with respect to the record 56 can be picked up either by a pick-up that amplifies vibration of the needle or a pick-up of the type shown in the phonograph of FIG. 1 which picks up vibrations of the record strip. Of course, whichever portion, the needle of the record, is intended to vibrate should have a low mass and be free to vibrate while the other is preferably massive to impede vibration. Depending on the type of pick-up used, the grooves can be modulated either laterally or in depth.

Thus, the invention provides a simple toy phonograph which operates in a novel manner to reproduce sounds. The phonograph utilizes a record which contains grooves over a very high proportion of its surface area, so that a long period of sound reproduction can be obtained. In the case of records of the type shown in FIGS. 1–5, it is possible to have the needles engage every other groove or every third groove, etc. In this way, the same pictures can be relayed with several different sound tracks being sounded at different times.

The invention also provides very simple apparatus for picking up and amplifying sounds; this is accomplished by coupling the center of a speaker cone or other pick-up to the record medium itself, rather than the needle, and amplifying the vibrations of the record. Of course, it is desirable to support the needle so that it resists vibrations, to maximize the amplitude of record vibrations and therefore the sound volume. This manner of pick-up can be used with an ordinary strip record where the groove runs along its length, or with a variety of other record types.

Although particular embodiments of the invention have been described and illustrated herein, it is recognized that modifications and variations may readily occur to those skilled in the art and, consequently, it is intended that the claims be interpreted to cover such modifications and equivalents.

What is claimed is:

1. A phonograph comprising:
an elongated strip record having a multiplicity of closely spaced grooves extending across its width, each groove having substantially a predetermined radius of curvature;
a head having a plurality of styluses arranged in a circle of approximately the same radius as said radius of curvature of said grooves; and
means for rotating said head about an axis while at least one of said styluses is engaged with one of said grooves, said axis being displaced from the center of curvature of said one groove with which said one stylus is engaged to move said strip record in one direction as said one stylus moves along said one groove.

2. The phonograph described in claim 1 wherein:
said grooves are modulated in height; and including
speaker means having a pick-up disposed against the face of said strip which is opposite said styluses, whereby vibrations of said strip are picked up.

3. A toy phonograph comprising:
a housing having a window;
an elongated record with opposite faces, said record having a multiplicity of sound-defining grooves in at least one of said faces, which extend substantially perpendicular to the length of said record, and said record having a plurality of different picture portions on at least one of said faces, said record disposed in said housing with a portion of said face which contains picture portions behind said window to enable the viewing of the picture portion through said window;
a head having a plurality of styluses, at least one of said styluses engaged with one of said grooves; and
means for turning said head so that successive styluses enter grooves in said record, said styluses arranged on said head to engage successive grooves to advance said record as said head is turned.

4. The toy phonograph described in claim 3 wherein:
said grooves are curved with substantially a predetermined radius of curvature; and
said styluses are arranged substantially in a circle, and said head is rotatably mounted about an axis which is displaced from the center of curvature of a groove engaged by one of said styluses.

5. The toy phonograph described in claim 3 including:
an acoustical speaker cone having a central portion coupled to a face of said record which is opposite the face which has said multiplicity of grooves.

6. A toy phonograph comprising:
a record having a first face with at least one groove therein, the bottom of said groove being modulated in depth, said record comprising a strip with a plurality of grooves extending substantially perpendicular to its length;
a stylus for engaging said groove;
means for supporting said stylus to resist vibrations thereof toward and away from said record, said means for supporting said stylus comprising a rotatable head with a plurality of additional styluses thereon;
means for moving said stylus and groove relative to each other, said means for moving comprising means for rotating said rotatable head; and
speaker means for engaging said record for amplifying vibrations of said record, said speaker means comprising an acoustical speaker with a resiliently mounted cone, a center portion of said cone in contact with a second face of said record which is opposite said first face, said styluses being arranged on said head to progressively engage grooves along said record to move said record past said speaker means.

* * * * *